June 18, 1929.  H. E. MOORE  1,718,062
ANIMAL POKE
Filed July 7, 1927
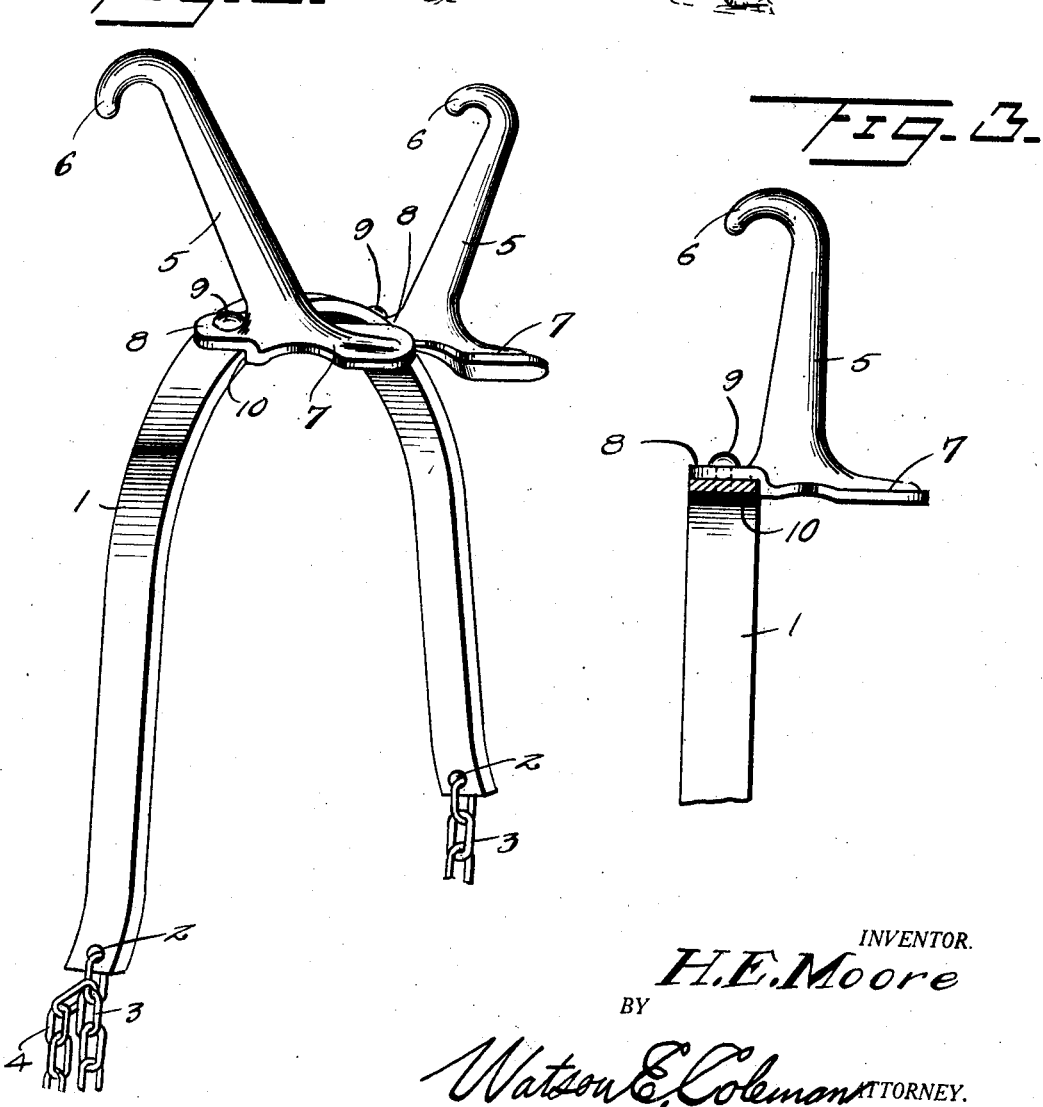
INVENTOR.
H. E. Moore
BY
Watson E. Coleman ATTORNEY.

Patented June 18, 1929.

UNITED STATES PATENT OFFICE.

1,718,062

HARRY E. MOORE, OF SMITHFIELD, NEBRASKA.

ANIMAL POKE.

Application filed July 7, 1927. Serial No. 204,041.

This invention relates to animal pokes and it is an object of the invention to provide a device of this kind which is applied to the animal in a manner whereby the same functions without injury to the animal and which is constructed in a manner avoiding the use of prongs, barbs and the like so that should the poke become detached from the animal and lost in the pasture there is no liability of injury to an animal or person who may tread on the poke.

Another object of the invention is to provide a device of this kind whereby pressure is imposed upon the sensitive portions of the back of the animal to which the device is applied to induce the animal to desist from attempts to go through fences.

A still further object of the invention is to provide a device of this kind which, when applied, does not impose injury to the animal should the poke be brought into contact with obstructions, such as low doors, boughs of trees and the like.

The invention consists in the details of construction and in the combination and arrangement of the several parts of my improved animal poke whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in perspective illustrating an animal poke constructed in accordance with an embodiment of my invention in applied position;

Figure 2 is a view in perspective of the poke as herein disclosed unapplied, a portion of the girth being broken away;

Figure 3 is a view partly in section and partly in side elevation of the device as herein embodied.

As disclosed in the accompanying drawing, my improved poke comprises a bar 1 preferably of steel adapted to be applied from above on the back of an animal, said bar being bent to conform to the portion of the body immediately to the rear of the shoulders.

The extremities of the bar 1 have pivotally or freely connected thereto, as at 2, the opposite end portions of a flexible member 3 preferably a chain. This member or chain extends beneath the body of the animal and is adjustable as to length, as indicated at 4, whereby the bar 1 is maintained in effective position upon the animal.

Closely adjacent to and at opposite sides of the longitudinal center of the bar 1, or what might be termed the top thereof, are a pair of upwardly disposed and laterally diverging members 5 having their upper extremities continued by the forwardly disposed hook members 6. The lower portion of each of the members 5 is provided with an extension or foot 7 disposed laterally with respect to the bar 1 and in a rearward direction when the device is in applied position. This extension or foot 7 is substantially pedal shaped in form.

Each of the members 6 at its lower portion is also provided with a forwardly disposed relatively short arm or extension 8 which overlies the bar 1 and is secured thereto by a rivet 9 or the like. This arm 8 is slightly spaced upwardly with respect to the under surface of the adjacent inner end of the member 5 resulting in a shoulder 10 which is in close contact with the rear edge of the bar 1. It is also to be noted that each of the extensions or arms 7 at its outer portion has an elongated and relatively broad flat surface for contact with the animal and that the outer or free end thereof is blunt.

With my improved poke in applied position upon the back of an animal, should the animal attempt to crawl through a wire fence, a strand comprised in such fence will slide or ride upwardly of the members 5 and lodge or engage within the hook members 6 resulting in the production of mechanical power to tilt the device as a whole rearwardly, causing the lateral extensions or pedals 7 to impose great pressure on such sensitive portions of the back of the animal without penetrating or piercing the skin and flesh. As a result of this pressure, the animal will desist in such effort.

The flexible member or chain 3, or girth as it may be called, is connected with the extremities of the bar 1 in a manner which allows for the pivotal connections between the bar 1 and member or girth 3, thus allowing the members 5 together with the bar 1 to be freely tilted when the members 5 are brought in contact with the wires of a fence.

By applying the device upon the back of the animal immediately to the rear of the shoulders, it is assured that the extensions or pedals 7 will exert pressure on portions of the animal which are extremely sensitive.

It is to be particularly noted that my improved poke is free of prongs or barbs which if used will penetrate the flesh of the animal with resultant injury and by the omission of such prongs or barbs safeguard is provided against injury by an animal or person treading upon a poke which may be lost in the pasture.

From the foregoing description it is thought to be obvious that an animal poke constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An animal poke comprising a bar designed to be secured to an animal's back, a pair of rigid upwardly and laterally extending members, an arm carried at the lower end of each member and secured to said bar, and a foot extending from the lower end of each member in a plane below the adjacent arm and having a broad substantially flat under surface designed to rest upon the animal's back, said arms and feet at the point of joinder being formed to provide a shoulder adapted to bear against an edge of said bar.

2. An animal poke comprising a yoke bar formed to straddle an animal's back, a pair of rigid upwardly and outwardly directed members carried by the yoke at opposite sides of the longitudinal center thereof, each of said members terminating at its upper end in a hook, an arm projecting from the lower end of each of said members and constituting means for securing the members to the yoke, a relatively broad flat foot extending from the lower end of each member, and oppositely directed with respect to the adjacent arm, for contact with the back of an animal, said arms being in a higher plane than the foot adjacent thereto forming a shoulder designed to abut an adjacent edge of the yoke to assist in maintaining the member in position.

In testimony whereof I hereunto affix my signature.

HARRY E. MOORE.